UNITED STATES PATENT OFFICE 1,992,589

ORGANIC FIBER AND METHOD OF PREPARING SAME

George R. Tucker, North Andover, and Langley W. Isom, Belmont, Mass., assignors to Dewey and Almy Chemical Company, North Cambridge, Mass., a corporation of Massachusetts No Drawing. Application April 17, 1931, Serial No. 530,996

4 Claims. (Cl. 92—21)

This invention relates to the preparation of organic fibers for paper-making and certain other fiber assembly processes; and it comprises the suspension of organic fibers in a watery medium; the admixture therewith of an aqueous dispersion of colloidal rubber particles, said particles being characterized by the fact that, when subjected to a potential gradient in an electrolytic cell, they tend to electrophoretically deposit on the cathode thereof; and further, the maintenance of the suspension of said fibers in the presence of said colloidal rubber particles until spontaneous consociation of said fibers and said rubber particles takes place; all as hereinafter more fully described and claimed.

Fibers prepared according to the process of the invention may be assembled according to any of the well-known fiber molding, felting, sheeting, or paper-making processes whereby such articles as rubberized paper, artificial leather, insole material, fiber board, etc. may be manufactured.

An object of the invention is to provide a cheaper process than any heretofore known for the treatment of organic fibers with aqueous rubber dispersions. Another object is to provide a simpler and more easily controllable process for the treatment of organic fibers with aqueous rubber dispersions. Another object is to provide a more intimate distributive consociation of rubber particles of colloidal dimensions and fiber than has heretofore been possible. Still another object is to provide rubber-fiber articles possessing less water absorptivity than possessed by articles made by prior processes. Other objects and advantages of the invention will become apparent with its more detailed description.

If an ordinary aqueous rubber dispersion, i. e. commercial latex (ammonia-preserved Hevea latex), or any natural latex, or any artificial dispersion of rubber in an aqueous medium, be added to an aqueous slurry of organic fibers, e. g. ordinary paper pulp, the dispersing liquor of the slurry becomes turbid and remains cloudy due to the presence of colloidally dispersed rubber particles. There is substantially no tendency for the rubber particles to become attachedly consociated with the fibers of the slurry. If such a fiber slurry, for example, were passed through an ordinary paper-making machine, most of the rubber would be lost in the "white water" and only such small amount as was aliquot to the water remaining with the fibers would, upon desiccation, become attachedly consociated with the assembled fibers, an economically impractical process for the treatment of fibers with an aqueous rubber dispersion. This particular impracticability has been overcome in prior processes by the addition of a coagulant to the slurry before assemblage of the fibers thereof. The function of the coagulant is to coagulate the colloidally dispersed rubber particles into small coagula with consequent entrainment and retention of these coagula by the dispersed fibers. The bath then becomes clear, i. e., free from colloidally dispersed rubber particles, and all of the coagulated rubber remains attachedly consociated with the fibers when the aqueous dispersing medium is removed therefrom as by pressure or gravity.

These prior processes, however, are attended with certain serious disadvantages and limitations which have militated against their more general adoption. If the coagulant be added too rapidly, relatively large hunks or clots of rubber are formed and deposited within the fibrous mass with consequent lack of uniformity and rubber continuity in the finished product. For good results it is essential that the coagulant be added very slowly and with a precise and careful control such as is possible but rarely feasible in the art of treating fiber slurries. This procedure is inevitably expensive. Even under best conditions, an entirely satisfactory result is not obtained. The rubber particles retained by the fibers are always coagulated or clotted (for that is the very function of the coagulant) and, particularly if the proportion of rubber present be small, uniformity of rubber distribution is sacrificed. Furthermore, the nature and character of the coagulant used frequently leads to unsatisfactory aging qualities in the finished product; and, moreover, rubber in ordinary aqueous dispersions is associated with certain non-rubber constituents which, due to the action of the coagulant, are carried into the finished product and lead to an objectionable water-absorptivity.

We have now discovered that all these disadvantages are overcome and new advantages accrue if organic fibers be treated with an aqueous dispersion of colloidal rubber particles, said particles being characterized by the fact that, when subjected to a potential gradient in an electrolytic cell, they electrophoretically deposit, or tend to electrophoretically deposit, on the cathode thereof, i. e. are electropositive in character.

In contradistinction to the colloidal particles of rubber dispersions suited to our invention, the colloidal particles of all ordinary aqueous rubber dispersions, i. e. of ordinary commercial rubber latex (ammonia-preserved Hevea latex) of all natural latices, or of all artificial dispersions of rubber in an aqueous medium, electrophoretically deposit, or tend to electrophoretically deposit, so far as we are aware, on the anode of an electrolytic cell.

Cathode-depositing aqueous rubber dispersions have long been known and are generally prepared by adding under suitable conditions to an anode-depositing dispersion, e. g. commercial rubber latex, certain appropriate agents. These agents are such as strong mineral acids, polyvalent metal salts, etc.; but inasmuch as methods are generally known for the preparation of cathode-depositing dispersions and these methods form no part of the present invention, it will not be necessary further to describe them here. All cathode-depositing aqueous rubber dispersions are or may be adapted to the purposes of the present invention.

The term "fibers", as used herein, is inclusive of animal and vegetable fibers only, such as are exemplified by cotton, ramie, jute, wool, hair, shredded leather, natural or artificial silk, wood fiber, etc.; which, as a class become consociated with cathode-migrating, or electro-positive, rubber particles in an aqueous dispersion. Filamentous inorganic bodies, which are frequently designated as fibers or fibrous, do not, as a class, become thus consociated with rubber particles, whether those be electro-positive or electro-negative in character.

According to our invention in its broadest embodiment we add a cathode-depositing rubber dispersion to an aqueous slurry of organic fibers, stir or agitate the slurry to disseminate the rubber particles among the fibers, permit spontaneous consociation of the rubber particles and the fibers to take place, and then assemble the so-treated fibers according to any of the well-known fiber molding, felting, sheeting, or paper-making processes. Unlike the rubber particles of anode-depositing dispersions, the rubber particles of cathode-depositing dispersions become attachedly consociated with animal or vegetable fibers of an aqueous slurry without the necessity of a coagulant; i. e. when the liquor of the slurry is removed as by pressure or gravity, all of the rubber is retained by the fibers. Furthermore, while the rubber particles of prior processes were, under the influence of the coagulant, entrained as more or less large coagula, the present invention requires no coagulant and the rubber particles become attached to the fiber surfaces in substantially the same state of individuality in which they initially existed in the cathode-depositing dispersion, that is, they are still of colloidal dimensions. Under the microscope fibers treated according to this invention may be seen to be spotted with adherent individual rubber particles or minute groups of particles, both of colloidal dimensions, and to display a greater uniformity of rubber distribution thereon than has been realized in prior processes, and this is of advantage.

By "colloidal dimensions", as herein used, is meant such particle size as will permit electrophoretic migration towards the cathode of an electrolytic cell.

The organic fiber slurry which is to be treated with a cathode-depositing dispersion may be prepared in a variety of ways. Thus, for example, the fiber may be merely slurried in water by stirring the mass in a suitable tank; but for most purposes it is preferable to beat the fiber in an ordinary paper beater or to pass it through a Jordan engine in accordance with usual paper-making practice.

After the fiber has been suitably wet and/or prepared as for paper-making, it is ready to be treated with the cathode-depositing rubber dispersion. At this point the consistency of the slurry should be sufficiently fluid to permit rapid mixing. Such will usually obtain at fiber concentrations of from 2 to 10%. The cathode-depositing rubber dispersion is then added to the agitated fiber slurry and mixing continued until the dispersing liquor is entirely free from visible rubber turbidity. This will usually occur in 5 to 20 minutes as contrasted with the 2 to 3 hours required for satisfactory rubber deposition in prior processes.

The cathode-depositing rubber dispersion should preferably be added to the fiber slurry in dilute form. For most purposes a rubber concentration of about 5% is satisfactory. In order to obtain best results, the rubber dispersion should be added slowly. Sometimes it is desirable to spray the dispersion into the agitated mass. This procedure is particularly applicable when the mixing is done in a paper beater, in which case the rubber dispersion is sprayed into the beater immediately in front of the raised beater roll. We have found that satisfactory results are obtained if the dispersion be introduced at such a rate that the contents of the beater make at least twenty complete circuits of the beater while the cathode-depositing rubber dispersion is being added.

According to the present invention a quantity of rubber corresponding to at least the weight of the fiber may be associated therewith. The upper limit of rubber-fiber consociation ratio by the process of this invention has not been experimentally determined; but as the extent of fiber surface is thought to be a function of this process, it follows that any increase of fiber surface, as by the effect of beating in a beating engine, will permit of an increase in rubber consociation as will also a choice of latex consisting for the most part of large colloidal globules or minute colloidal aggregates of the smaller latex globules. For many purposes, however, such as for the manufacture of artificial leather, insole material, etc., a content of about 20% of rubber will give satisfactory results. For some other purposes, such as paper-making for example, a very small percentage may be advantageously effective.

Cathode-depositing aqueous rubber dispersions may be prepared possessing widely different properties. These properties may be chosen, regulated, and adjusted to the requirements of the fiber slurry. We generally prefer to use dispersions which are acid in reaction and/or possess comparatively high colloidal stability, although, under ce tain conditions as when pigments or curative agents adversely affected by acid are present, it is sometimes desirable to use dispersions which are alkaline in reaction and/or possess relatively little colloidal stability. The acidity or alkalinity of the rubber disperson is adapted to and determined by the hydrogen ion concentration desired in the treated slurry, and this latter aspect of fiber treatment is too well known and understood to require further description.

The colloidal stability of the cathode-depositing dispersion determines the rate at which the bath will clear when the disperson is added to a fiber slurry. If the colloidal stability be high, the rate of clearing will be relatively slow: if the colloidal stability be low, however, the rate of clearing will be relatively rapid. A relatively slow rate of clearing insures greater uniformity of rubber distribution which is of advantage. A high colloidal stability, which does not, however, unduly prolong the operation, is therefore desirable.

The colloidal stability of a cathode-depositing rubber disperson may be enhanced by certain suitable protective agents. These are generally known and are such as hemoglobin, serum albumen, acid proteins in general, polyvalent cations, etc. The relative colloidal stabilities of cathode-depositing rubber dispersons may be compared and measured by means of the mechanical agitation test commonly applied to ordinary rubber latex.

While, for purposes of control and uniformity of rubber distribution, it is desirable to employ cathode-depositing rubber dispersions of relatively high colloidal stability, it is apparent that too great a colloidal stability may tend to prevent clearing of the aqueous bath and thereby defeat the purpose of the process. This condition is to be avoided but sometimes may be encountered in artificial dispersons due to the presence of large quantities of non-polar hydrophilic colloidal material in such cathode-depositing rubber dispersion. (Such hydrophilic material may be gums and the like which are frequently used in the preparation of artificial rubber dispersions.) The presence of such material is objectionable not only from this standpoint, but, even when present in lesser quantity than would defeat the purpose of the process, it may cause an objectionable water-absorptivity in the finished product and so defeat one of the objects of the invention.

Sometimes, and with certain fibers, it is desirable to accentuate the tendency of the colloidally dispersed rubber particles to consociate with the fiber. We have found that this consociation tendency may be accentuated by adding to the aqueous bath of the fibrous slurry certain materials which are commonly used as wetting agents and are such as turkey red oil, sulfonated oils in general, the alkali salts of certain aromatic sulfonic acids, e. g. the product obtained by condensing B-naphthalene sulfonic acid with isopropyl alcohol, etc. When added to the bath in quantities equal to one-half of one per cent or less of the weight of dry fiber present in the slurry, these materials will accelerate and accentuate the clearing of the bath of colloidally dispersed cathode-depositing rubber particles with consequent consociation of the rubber particles with the fibers. This, therefore, provides another means of determining and controlling the rate of clearing of colloidal rubber turbidity in the bath and deposition of colloidally dispersed cathode-depositing rubber particles upon fiber surfaces.

It is not known what instrumentalities determine and effect the consociation of colloidally dispersed cathode-depositing rubber particles and organic fibers. For purposes of description, we rather content ourselves with the empirical observation of fact and those conditions which alter and control the consociation. The behavior is specific to cathode-depositing dispersions; but it is not known whether it is directly due to a positive electrical charge borne by the colloidally dispersed rubber particles and exemplified by their cathode-migrating tendency, or whether it is due to structural differences inherently but incidentally associated with colloidally dispersed rubber particles when they are cathode-depositing in nature. The consociation may be due to simple adsorption and analogous to the adsorption by fibers of colloidal dyestuffs, or it may be one of adherence between rubber and fiber and capable of manifesting itself only when the rubber particles are cathode-depositing in nature. Thus, it may be that those hydrophilic protective agents naturally present in or added to and essential to the colloidal stability of anode-depositing rubber dispersions prevent the manifestation of a natural adhesiveness between rubber particles and organic fibers; while those agents, which are or become entirely different in chemical nature, present in or added to and essential to the stability of cathode-depositing rubber dispersions are not inimical to a manifestation of the natural adhesiveness of a rubber particle for an organic fiber surface. Another similar hypothesis, which is in accordance with a well-known theory regarding the structure of the rubber latex particle, assumes that the rubber particles of anode-depositing dispersions are enveloped by an alkaline protein skin or adsorbed layer which prevents contact and adhesion between rubber and organic fibers but of which the rubber particles are stripped or denuded when the anode-depositing dispersion is subjected to the step necessary for electrical charge reversal, and then, once denuded of their alkaline protein layer, the cathode-depositing rubber particles are free to contact with and adhere to the organic fiber surfaces. This latter hypothesis is furthermore entirely in accord with the known fact and the experimental observation that charge reversal procedures for ordinary rubber latex remove (precipitate) part of the natural protein present in the latex and chemically alter and denature the remaining unprecipitated portion. Whatever the true explanation of the consociation may be, however, the fact remains that the process provides and permits a more intimate and uniformly disposed consociation of fiber and latex rubber than has hitherto been possible.

When desired, the invention permits of the inclusion of filling, compounding, curative, and pigmenting agents. These may be added to the fiber slurry prior to the addition of the rubber dispersion thereto. For this purpose best results will be obtained if the materials are added as a water suspension which has been previously ground, such as in a paint or ball mill, to insure fineness of subdivision. Examples of suitable filling, compounding, curative, and pigmenting agents are whiting, barytes, carbon black, iron oxide, sulfur, zinc oxide, graphite, suitable accelerators of vulcanization, rubber antioxidants, etc.

While our invention has been described with particular reference to organic fibers suspended in water, as for paper-making or the like, it will be apparent to those skilled in the art that organic fibers may be contacted with cathode-depositing rubber dispersions without first suspending the fibers in water. Thus a textile assembly of fibers such as woven fabrics, bats, or felts, may be immersed in a cathode-depositing rubber dispersion and a spontaneous consociation of rubber and the fibers permitted to take place.

It should be understood that the present disclosure is for the purpose of illustration only, and that this invention includes all modifications and equivalents which fall within the scope of the appended claims.

We claim:

1. Method of preparing organic fibers for the purpose described which comprises contacting said fibers with an aqueous dispersion of cathode-depositing colloidal rubber causing spontaneous consociation of said fibers and said rubber to take place.

2. Method for making fiber-rubber products which comprises mixing organic fibers in aqueous suspension with cathode-depositing rubber particles whereby deposition of the rubber particles on the fiber surfaces is effected and subsequently forming a sheet from the resulting rubberized slurry.

3. Method of preparing cellulose fibers which comprises contacting said fibers with an aqueous dispersion of cathode-depositing colloidal rubber and causing spontaneous consociation of said fibers and said rubber to take place.

4. Method for making cellulose fiber-rubber products which comprises mixing cellulose fibers in aqueous suspension with cathode-depositing rubber particles whereby deposition of the rubber particles on the fiber surfaces is effected and subsequently forming a sheet from the resulting rubberized slurry.

GEORGE R. TUCKER.
LANGLEY W. ISOM.